Figure 1:
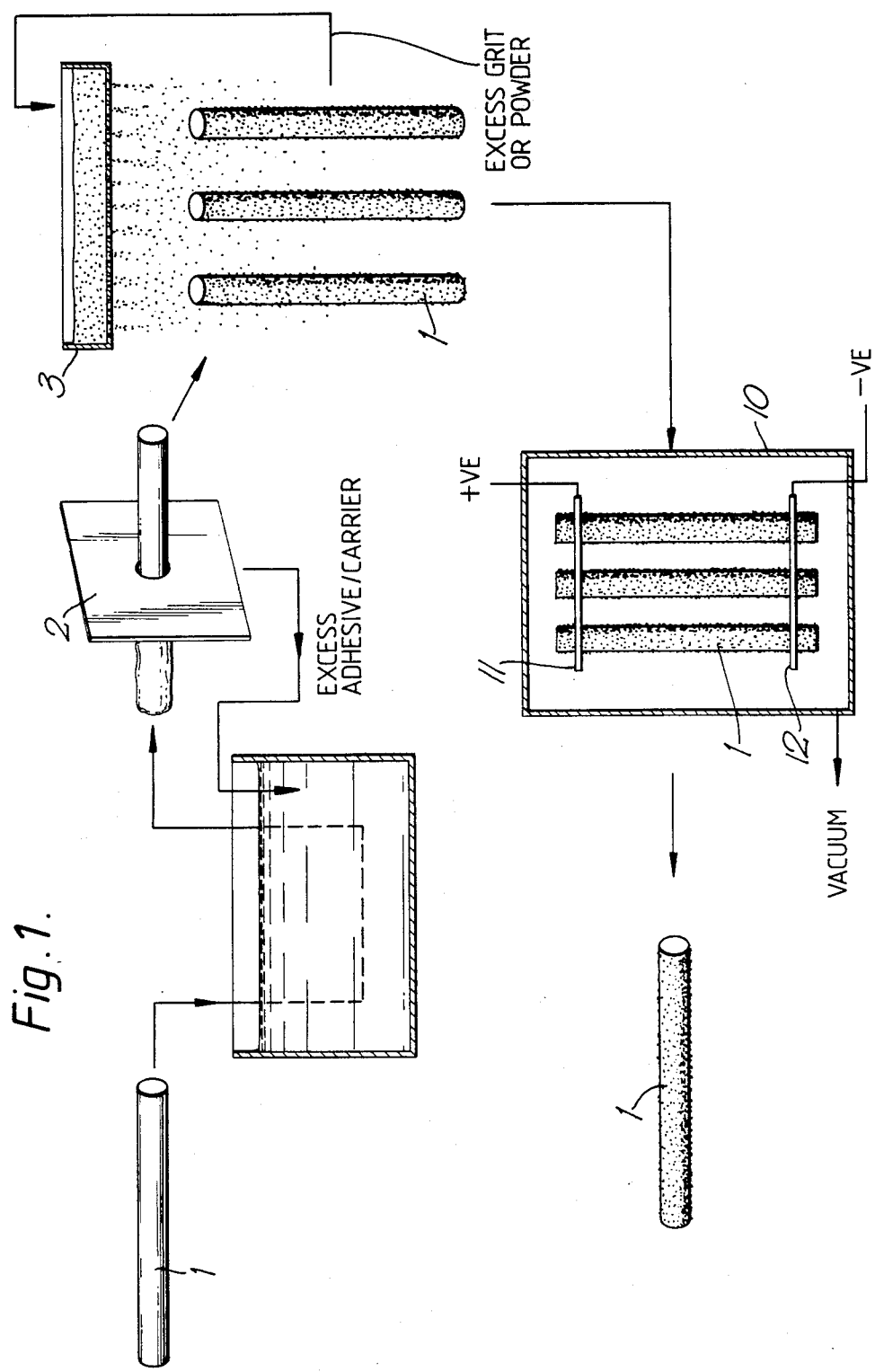

United States Patent [19]

Nicolson

[11] Patent Number: 4,643,740
[45] Date of Patent: Feb. 17, 1987

[54] METHOD FOR APPLYING MATERIAL TO A SUBSTRATE

[75] Inventor: Peter J. Nicolson, St Neots, England

[73] Assignee: C4 Carbides plc, Cambridge, England

[21] Appl. No.: 787,377

[22] Filed: Oct. 15, 1985

[30] Foreign Application Priority Data

Oct. 15, 1984 [GB] United Kingdom ............... 8426036

[51] Int. Cl.⁴ .............................................. B24D 3/00
[52] U.S. Cl. ...................................... 51/293; 51/295; 51/298; 51/309; 428/698
[58] Field of Search ................. 51/293, 295, 298, 309; 428/698

[56] References Cited

U.S. PATENT DOCUMENTS

| 3,615,309 | 10/1971 | Dawson | 51/309 |
| 4,070,796 | 1/1978 | Scott | 51/293 |
| 4,150,514 | 4/1979 | Douglass | 51/293 |
| 4,422,407 | 12/1983 | Bessot et al. | 118/50.1 |
| 4,496,372 | 1/1985 | Almond et al. | 51/293 |
| 4,532,151 | 7/1985 | Stenlund | 118/50.1 |

FOREIGN PATENT DOCUMENTS 0836730  6/1960  United Kingdom .

Primary Examiner—Lorenzo B. Hayes
Assistant Examiner—Willie J. Thompson
Attorney, Agent, or Firm—Wenderoth, Lind & Ponack

[57] ABSTRACT

The invention relates to a process for brazing refractory particles, notably tungsten carbide grits, onto a substrate such as a tool blank to provide an armor coating or a cutting edge thereon, which process comprises applying to the substrate a brazing material, a particulate refractory material to be brazed onto the substrate and a binder composition; and connecting the substrate to a source of an electric current to cause the current to flow through the substrate whereby the substrate is heated to sufficient temperature to cause the brazing material to fuse. The invention also provides apparatus for carrying out the invention.

12 Claims, 2 Drawing Figures

METHOD FOR APPLYING MATERIAL TO A SUBSTRATE

The present invention relates to a method for applying a material to a substrate, notably to the application of particles of a diamond-like substance to a metal substrate and sintering that substance to the substrate to form a cutting or abrasive edge or surface on the substrate which can then be used as a worktool.

It is known to apply tungsten carbide and other diamond like particulate materials to a substrate and to fuse them onto the substrate by a brazing process to give armoured tools or to provide cutting edges on tools. The heat necessary to cause to brazing has been achieved by a number of methods involving the external application of heat to the particle coated substrate. Thus, in BP No. 836730 tungsten carbide grit is brazed to a metal substrate using hot sand or a furnace to achieve the brazing; in BP 856231 tungsten carbide grits and a brazing material containing copper or a copper oxide are applied to a metal substrate in a volatilisable carrier/adhesive and the coated substrate heated in a furnace; and in U.S. Pat. No. 3,615,309 tungsten carbide grit is brazed onto a metal substrate using an induction furnace. Other methods for heating the substrate to achieve brazing of tungsten carbide grits onto the substrate include the use of a gas torch or a welding flame.

All the methods proposed or used hitherto apply heat from an external source and apply the heat from the exterior of the coated substrate. Where large scale production is practised, this method of heating makes it possible to pass a continuous length of wire through a brazing powder application stage, through a grit application stage and then through an electric induction furnace in a continuous process. However, such a process is inflexible in that it can be used economically only on large scale operations where large numbers of a similar article are to be produced. It cannot readily be applied to operations in which articles of different shapes are to be produced since this requires that the production run be interrupted and a feed of a different material substituted, which may also require the use of a different heating pattern.

We have now devised a method for brazing particulate material onto a metal substrate which can be applied to a number of different shaped articles simultaneously or in sequence. In the method of the invention, the heat required to braze the coating material onto the substrate is generated from within the substrate. As a result, the risk of disturbing the coating due to applying heat externally onto it is reduced. Melting of the coating is initiated from the lower layers of the coating, so that the outer layers provide protection against oxidation thereof and the substrate/braze interface reaches a substantially uniform temperature, reducing the risk of localised overheating of the substrate or the cutting edges of the applied grit and aiding controlled melting of the braze to aid uniform wetting of the applied grit. Since the energy required for heating the substrate is applied directly, the overall efficiency of energy utilisation is enhanced and the insulating effect of the coating layer acts to aid conservation of energy, rather than acting as a barrier to energy transmission to the brazing material as when the energy is applied from an external source. Furthermore, the high temperatures required for brazing of the particles to the substrate can often be achieved in a time which is sufficiently short for the gases generated by the volatilisation of the binder component of the coating to remain around the substrate and act as a protective atmosphere. It may therefore be possible to operate the process of the invention without the need for vacuum or inert protective atmospheres hitherto considered necessary with prior methods of brazing.

Accordingly, the present invention provides a process for brazing refractory particles onto a substrate, which method comprises applying a brazing material, a particulate refractory material to be brazed onto the substrate and a binder composition to the substrate; and feeding an electric current through the substrate whereby the substrate is heated to sufficient temperature to cause the brazing material to fuse.

Preferably, the substrate is a workpiece to be used to cut materials, e.g. a cutting tool such as a saw, band saw or rod saw; or a tool which is to be used to abrade or smooth materials, e.g. a sanding disc or sheet. The invention is of especial use in the production of elongated workpieces, notably those where the length is more than twice the width, and will, for convenience be described hereinafter in terms of the production of a rod saw, typically having a length from 10 to 10,000 times its diameter.

The substrate is made from an electrically conductive material so that the electrical current required to heat the substrate can be passed through the substrate itself. Thus, it will usually be preferred that the substrate be made from a steel, notably a tool or hardened steel. The substrate can be formed from the desired material by any suitable technique, e.g. drawing, stamping, rolling or casting. In the case of a rod saw, the blank for the saw is conveniently formed by drawing a tool steel through a suitable die to give a rod of the desired diameter; and cutting the rod to the desired lengths. Typically, the ends of the cut rods will have eyes or other terminals affixed or formed thereon so that the saw can be mounted in a conventional hacksaw frame for use. The terminals can be formed by bending the ends of the rods to the desired shape or by forming a thinner section which fits into the blade mounting slots of the hacksaw frame. Alternatively, they can be formed by affixing suitable shaped terminals to the ends of the rods before the grit is applied to the rod. However, it is within the scope of the present invention to cut the rod to the desired length and to affix the terminals after the grit has been applied and brazed in place. Where the terminals are brazed on, this may be achieved during the brazing of the grit to the rod.

The substrate is preferably subjected to a cleaning process, e.g. a solvent degreasing or pickling process to remove grease and/or scale from the surface thereof.

The workpiece is prepared for heating in any suitable manner. Thus, a powdered metal brazing material can be applied to a substrate coated with a suitable binder material; and grits of a diamond-like material applied to the substrate using the various methods described in U.S. Pat. Nos. 3,023,490, 3,024,128, 3,449,146 or 3,615,309. The invention can be applied to the application of a wide range of grits to the workpiece; the optimum nature, composition, size and shape of the grit depending, as is known, upon the intended end use of the workpiece. Thus, the present invention can be used to form a substantially smooth armour coating on the substrate or can be used to form a cutting or abrasive coating on a basically smooth substrate.

The particulate refractory material or grit for present use can be selected from the carbides, nitrides, borides or silicides or many materials, notably of nickel or tungsten. The use of tungsten carbide is particularly preferred. The average size of the particulate material is selected according to the desired end use, the finer particle sizes being used to give smooth armour coatings, the coarser particle sizes being used for abrasive or cutting surfaces. Typically, where the particulate material is to be used to form the cutting edge on a rod saw, the particulate material will have a particle size of from 0.1 to 0.5 mms, but may be as large as 6 mms for coarse cutting tools. Where the grit is used to form an armoured coating on the substrate, the particle size is typically in the range 0.01 to 0.1 mms. The sizes quoted are the mass median particle size for a sample of the material and individual particles may fall outside the size range given.

The brazing material for present use is desirably one which fuses at a temperature above the temperatures required for heat treating or tempering the substrate. Thus, typical brazing materials for present use include cobalt-based and nickel-based alloys, notably those containing significant proportions of chromium. Alternatively, copper, copper oxide or a copper alloy such as bronze can be used. It is preferred that the brazing material also contain boron, silicon, phosphorus and iron. Suitable brazing materials are available commercially and can be used in their commercially available forms.

Preferably, the brazing material is used in the form of a powdered material having a particle size smaller than that of the particulate grit to be applied to the substrate, notably where the brazed coating is to act as the cutting or abrasive surface to the substrate. In such a case the brazing material will usually have a particle size of from 10% to 75% of the particle size of the grit. For example, where a tungsten carbide grit of particle size 0.2 to 0.5 mms is to be used, the brazing material will typically have a particle size of from 0.09 to 0.15 mms.

The brazing material and particulate refractory material are held onto the substrate prior to brazing by a suitable binder. This is preferably a volatile or thermally decomposable material which is substantially eliminated from the coating on the substrate during the brazing. Typical materials for present use will be substantially free from sulphur and be based on organic materials. It is also preferred that the binder is applied as a mobile or semi-mobile fluid, emulsion, dispersion or suspension, notably in a solvent such as ethanol or, more preferably, an aqueous medium so that it can be applied by spray, roller or dip techniques to the substrate. Thus, the adhesive/carrier can be Shellac as described in the above U.S. patents. Alternative materials include natural and synthetic polymers, e.g. acrylate polymers or rubber substitutes such as neoprenes. If desired, the binder composition may include other components which volatilise upon heating to aid the formation of a protective atmosphere around the substrate during the brazing process.

In a particularly preferred method for applying the binder to the substrate, the binder is applied to a carrier tape, sheet or other flexible base. The flexible base is then applied to the desired portion of the substrate with the binder acting as the interface between the substrate and the flexible base. The substrate can then be stored for prolonged periods with the base acting as a protective medium for the interface binder layer on the substrate. When it is desired to use the substrate, the flexible base is peeled or otherwise removed from the substrate to expose the binder layer adhering to the substrate.

This method of applying the binder is novel and aids the application of a substantially uniform amount of the binder to the substrate, notably where comparatively large areas of substrate are to be coated and/or where there is to be a prolonged period between application of the binder and the coating material.

Accordingly, the present invention also provides a substrate to which a brazeable coating is to be applied, which substrate carries on that area to carry the coating a flexible base material and as interface between the substrate and the flexible base material a binder composition suitable for use in adhering the brazeable coating composition to the substrate prior to brazing. The invention further provides a method for forming a brazed coating on a substrate in which the base material of a substrate of the invention is removed, a brazeable coating material is applied to the exposed binder interface on the substrate and the coated substrate is subjected to heating to cause the coating to be fused to the substrate. Preferably, the base material/binder interface is achieved by the use of what are known as transfer tapes and the binder material is an acrylic resin.

The binder composition can also contain one or more of the other components to be applied to the substrate. Thus, the composition can contain the brazing powder suspended therein optionally also with a flux, e.g. a fluoride or borax type of flux, to provide a protective atmosphere around the substrate during the brazing stage.

The binder composition can be applied to the substrate by any suitable method, e.g. by dip coating, roller application or by spraying, to apply the desired amount of binder. Preferably, the amount of binder applied is the minimum required to support the particulate and brazing materials to be applied. This amount will vary with different binder compositions and the load of particulate and other material to be carried by the substrate and the optimum amount can readily be determined by simple trial and error tests. Excess binder can be removed by an air blast over the substrate, by a squeegee or roller passing over the substrate or by means of a scraper or doctor blade. We have found that the use of a transfer tape to apply the binder offers the advantage that substantially uniform loadings of powder on the substrate can be achieved and that excess powder is readily removed by a single sharp rap on the substrate.

The particulate refractory material and brazing material can be applied to the substrate by any suitable method, e.g. any one of those described in the above U.S. patents. The brazing material and particulate material can be applied to the substrate before or after the application of the binder; or concurrently with it, as when the binder composition contains some or all of these other ingredients. Where the other ingredients are applied separately, this is conveniently achieved by sprinkling the powder or grit materials onto the binder coated substrate, e.g. from a vibratory feeder, a reciprocating screen or the like. Again, it is desired to remove excess material from the substrate using any suitable technique before it is heated.

The proportions of the binder, the particulate material, the brazing material and other ingredients applied to the substrate vary according to their nature and the end use for the workpiece. However, as a general guide where tungsten carbide grits are being applied to form the cutting edge of a rod saw, the overall coating applied to the rod will comprise 5 to 10 parts of tungsten carbide grit, 1 to 2 parts of a cobalt or nickel based brazing powder, from 2 to 5 parts of the binder and optionally from 1 to 2 parts of a flux such as borax, all parts being by dry weight.

The amount of material which is applied to the substrate will also depend upon the end use to which the treated substrate is to be put. Typically, for an armoured coating it will be desired to form a brazed layer on the substrate up to 0.2 mms thick. On the other hand, where tungsten carbide grits are applied to form a cutting edge or surface, it will usually be desired to form a brazed layer of the minimum thickness required to secure the grits to the substrate. In some cases, the brazing material may collect around the grit particles and leave a discontinuous coating over other areas of the substrate. The optimum amount of the overall composition for any given case can be readily determined by trial and error. Heating the substrate by passing an electric current through it has the co-incidental effect that the grit particles are caused to seat onto the substrate. This reduces the risk that some of the grits may be bonded tip down onto the substrate, thus aiding the security of the grits onto the brazed substrate.

The coating may contain other ingredients used in brazing processes, notably the flux referred to above. Suitable fluxes for present use include fluoride based fluxes and borax/boric acid mixtures. Preferably, the flux is used in powder form in admixture with one or more of the other solid ingredients to be applied to the substrate.

The coated substrate is heated to cause the brazing material to fuse to form an interface between the particulate material and the metal of the substrate. Typically, brazing will occur in the range 600° to 1200° C. It is also desired that the brazing temperature be reached as soon as practicable, so as to reduce residence time of the workpieces in the heating zone where a batch process is being used and to reduce the risk of loss of coating material as the coating becomes semi-mobile prior to the brazing temperature having been reached. The rate of heating of the substrate will depend primarily upon the cross-section of the substrate to which the electric current is applied, its resistance and the voltage applied across the substrate. Preferably, the current is applied at comparatively low voltages, typically 10 to 50 volts AC or DC.

The current is caused to flow through the substrate by making a direct contact between the substrate and a supply of electricity. The heating of the substrate is thus caused by the flow of the current through the substrate and not by induction or other externally applied heat sources.

The contact between the electrical supply and the substrate can be achieved in a number of ways. Thus, each substrate can be individually connected to the electrical supply by suitable terminal clips or the like affixed to each end of the substrate. However, it will usually be desired to treat a number of substrate simultaneously. This can be conveniently be achieved, by having clamp type connectors which are capable of accepting a number of substrates. For example, a connector can comprise a fixed section against which the ends of a series of rod substrates are clamped by a moveable section. The moveable section can be urged against the fixed section by a spring, quick release catches or the like to enable it to be released to permit removal of treated rods and insertion of fresh rods for treatment. Other forms of connectors can be readily devised to suit the particular type of substrate to be treated. Thus, where the rods already carry terminals, these can merely be hooked onto pins on a connector bar or the like, alternatively, the rods can be sprung into spring loaded sockets which allow for expansion of the rod during the brazing process. This expansion can also be used to trip a current switch to terminate the heating once a given temperature, and hence extent of expansion, has been achieved.

As indicated above, the coating can contain ingredients which volatilise and/or decompose to form a protective atmosphere around the article being heated for long enough for the brazing to be carried out without the need for operation in a vacuum or a separate protective atmosphere. Thus, where high currents, typically in excess of 250 amps, are passed through a rod saw substrate, brazing may be achieved in less than 1 second.

Where the coating applied to the substrate does not contain a flux or other material which evolves a protective gas within which the brazing can be carried out or where comparatively low electric currents are used, it will usually be desired to carry out the brazing in a suitable container which can be evacuated or into which an inert or reducing atmosphere can be fed. The method of the present invention offers the advantage over previous brazing methods using induction heating of continuous lengths of substrate that the substrates can be substantially sealed within a housing during brazing. The brazing can thus be carried out within a controlled atmosphere.

The housing can be of any suitable form and typically will comprise a chamber housing the substrate and the electrical connectors and connected to a vacuum pump. One face of the housing can be removable or can have a door or the like to permit insertion and removal of rods or other substrates from the housing. If desired, two or more of such housings can be operated in parallel and/or in series so that several batches of substrates can be treated simultaneously. Since the housing can be substantially isolated from the environment, the protective atmosphere within the housing can be of any desired composition and is not limited to those which can be obtained by the thermal decomposition of the coating. Thus, the atmosphere within the housing can be nitrogen, argon or other inert gas, hydrogen, methane, carbon monoxide, ammonia or mixtures of these, e.g. nitrogen and hydrogen.

In an alternative form of treatment where the coating contains a flux or protective atmosphere generating material, the connectors can be mounted on a stationary or a moving belt by which the substrates are carried from a feed station to a discharge station during their treatment without the provision of any protective housing. The flow of current to the substrates is regulated by a suitable timing circuit or device so that current is fed to the substrates in sequence along the belt, e.g. as they pass through the treatment zone.

The current will usually flow through the substrate from one end to the other. However, for complex shaped articles, it may be desired to connect one pole of the current supply to a series of points on the periphery of the article and to connect the other pole of the current supply to the centre of the article. Alternatively, where a long rod is to be treated and then cut into sections after brazing has been carried out, it may be desired to make connections to the rods at several points along its length rather than merely one contact at each end.

The substrates will have a brazed layer or coating thereon after the brazing operation. If desired, the brazed product can be subjected to further treatments, eg. heat treatment or surface finishing using conventional techniques.

Figure 2:
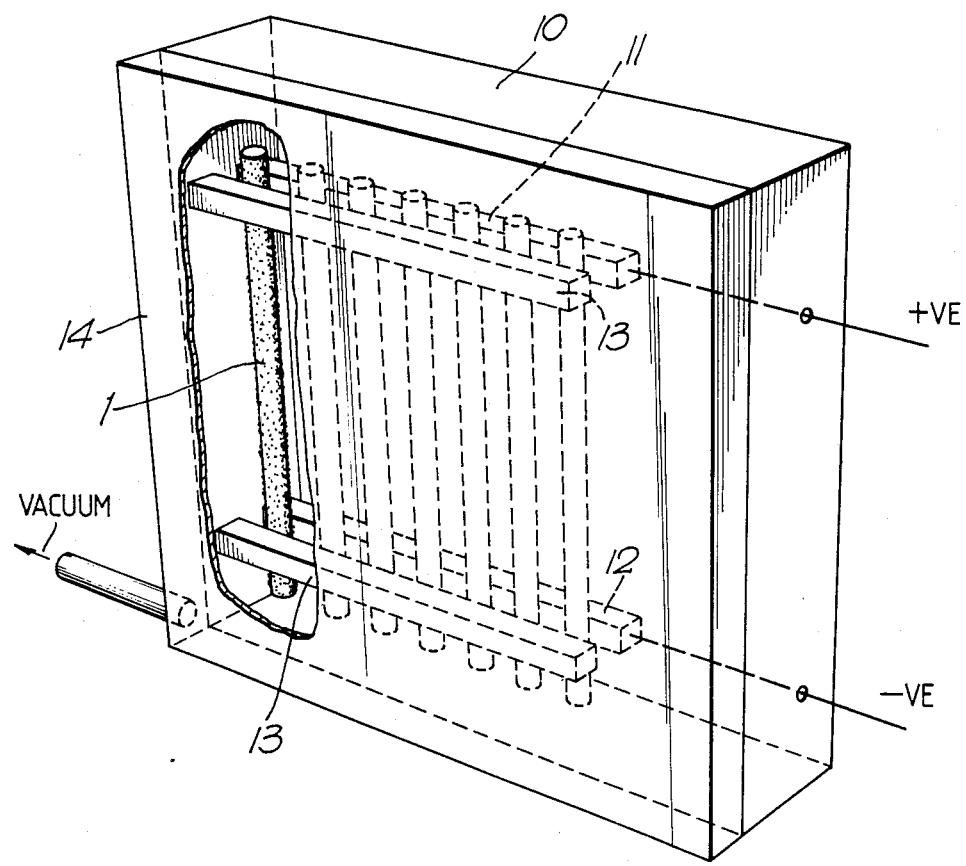

The invention will now be illustrated by the following Examples and with respect to the accompanying drawings in which FIG. 1 is a diagrammatic block flow diagram for the process and FIG. 2 is a diagrammatic elevational view of a brazing housing and connectors suitable for use in the process of FIG. 1.

A metal rod 1 suitable for use as the base for a rod saw typically has a substantially circular cross-section 2 to 6 mms in diameter. Other shapes of cross-section, e.g. square, triangular or circular with a flat or cusped face to one side, can also be used. The rod 1 is dipped into a tank containing an aqueous solution of the adhesive/binder to coat the rod. Excess adhesive/binder is removed by passing the rod through a hole or notch in a scraper board 2, or by means of a brush or squeegee roller.

The coated rod then passes under one or more vibrating screens 3 or other powder application means where the metallic brazing material and the refractory gift material are applied separately or together. Typically tungsten carbide grit of average particle size in the range 0.2 to 0.4 microns is applied first to the coated rod. A powdered metallic brazing material with a typical particle size of about 0.05 mms, optionally in admixture with a flux, is applied subsequently so that the particles of the brazing material lodge between the particles of the refractory grit to leave about 60% or more of the height of the grits standing proud of the brazing material.

The coated rod is fitted into a brazing housing which comprises a vacuum chamber 10 connected to a source of vacuum (not shown) and to a supply of electricity (not shown). Within the housing are an upper connector bar, e.g. a copper bar 11, and a similar lower connector bar 12. Each of the bars is connect to one pole of the electricity supply and has a clamping bar 13 which can be clamped onto the connector bar to trap the ends of the rods 1 between the connector bar and the clamping bar. The housing has a removable front cover member 14 which is connected to the source of vacuum and has a vent valve 15 whereby the interior of the housing 10 can be connected to the vacuum or to atmospheric pressure. In this way, the cover 14 can be readily removed merely by venting the housing to atmosphere, yet is held securely in place on the housing when the vacuum is applied to the housing.

The rods are placed in the housing with their ends clamped onto the connectors 11 and 12. The housing is closed by applying the cover 14 so that a vacuum of $10^{-1}$ Torr is drawn on the interior of the housing. Current is passed through the rods for the required time to raise the rods to the brazing temperature. The rods are protected against oxidation during the brazing in part by the volatile gases given off from the coating and also by drawing an inert or reducing gas into the housing or by evacuating the housing.

Typically, a current of from 50 to 250 amperes is fed to the rods at 10 to 30 volts DC and a brazing temperature of 800° to 1100° C. is achieved in from 5 to 20 seconds.

The brazed rods are removed from the housing and are often ready for use as such without further treatment. However, it may be desired to treat the rods further, e.g. to heat treat them using conventional techniques or to pass the still hot rods from the housing to a water or oil annealing bath. If desired, the brazed rods can be reheated by passing current through them again to re-heat them and thus heat temper them whilst they remain connected up in the housing.

EXAMPLE 1

The above process was carried out with a coating comprising an acrylic resin binder, a nickel alloy braze, tungsten grit and borax as the flux. This was applied to an 16 gauge steel wire substrate to provide a coating of 2 parts of binder carrying 6 parts grit, 6 parts braze and 1 part flux. The coating was fused by applying a current of 60 amps at 10 volts for 10 seconds. A temperature of 1080° C. was achieved and the atmosphere in the housing was a mixture of 5% hydrogen in nitrogen.

EXAMPLE 2

The process of Example 1 was repeated using a coating comprising a polyvinyl alcohol binder, a nickel braze and tungsten carbide grit. A current of 150 amps at 14 volts was passed for 2 seconds to achieve a brazing temperature of 1080° C. and a vacuum of $10^{-1}$ Torr was held during brazing without the use of a protective atmosphere.

EXAMPLE 3

The process of Example 1 was repeated using a hacksaw blade with a cross-section measuring 16 mms by 1.6 mms and 30 cms long. The current passed was 80 amps at 14 volts for 5 seconds to achieve brazing.

EXAMPLE 4

The process of Example 1 was repeated except that a current of 200 amps was passed at 28 volts to achieve a short brazing time and the cover 14 was not applied to the housing so that brazing was carried out in the protective atmosphere provide by the volatilisation and/or decomposition of the coating. Satisfactory brazing was achieved within 1 second without significant oxidation of the substrate.

EXAMPLE 5

The process of Example 3 was repeated using a current of 100 amps at 28 volts. The cover 14 of the housing was not applied and brazing was carried out in the protective atmosphere provided by the thermal decomposition and volatilisation products of the coating. Satisfactory brazing was achieved in less than 2 seconds without significant oxidation of the substrate.

EXAMPLE 6

The process of Example 3 was repeated. After the brazed blade had been allowed to cool naturally in the housing for 10 seconds, a further pulse of electric current was passed through the blade to heat it to 650° to 700° C. to heat temper the blade, after which it was allowed to cool and removed from the housing.

The products from Examples 1 to 6 were grit edged saws having the grit particles bonded firmly to the metal substrate. The saws were used to cut a wide range of materials over several months test work and were all found to perform satisfactorily and the grit remained firmly bonded to the substrate.

I claim:

1. A process for brazing refractory particles onto a substrate, which process comprises applying to the substrate a brazing material, a particulate refractory material to be brazed onto the substrate and a binder composition; and connecting the substrate to a source of an electric current to cause the current to flow through the substrate whereby the substrate is heated to sufficient temperature to cause the brazing material to fuse.

2. A process as claimed in claim 1 wherein after brazing the refractory material onto the substrate the substrate is re-heated to cause thermal tempering thereof by passing an electric current through the substrate.

3. A process as claimed in claim 1 wherein the particulate refractory material is selected from the carbides, nitrides, borides and silicides of nickel and tungsten and has a mass median particle size in the range 0.01 to 1.5 mms.

4. A process as claimed in claim 1 wherein the brazing material is selected from a cobalt-based and a nickel-based alloy.

5. A process as claimed in claim 1 wherein the binder composition comprises a material selected from a volatile material and a thermally decomposable material which is substantially eliminated from the coating on the substrate during the brazing process.

6. A process as claimed in claim 5 wherein the binder comprises an acrylic polymer.

7. A process as claimed in claim 1 wherein the coated substrate is heated by passing a current of from 50 to 250 amps at a voltage of 10 to 50 volts AC or DC through it.

8. A process as claimed in claim 1 wherein the coated substrate is heated in a protective atmosphere or under vacuum.

9. A process as claimed in claim 8 wherein the protective atmosphere is provided at least in part by the products of volatilisation and/or decomposition of the binder composition.

10. A process as claimed in claim 1 wherein the overall coating applied to the substrate comprises 5 to 10 parts of tungsten carbide refractory grit, 1 to 2 parts of a cobalt or nickel based brazing powder, from 2 to 5 parts of the binder and, optionally, from 1 to 2 parts of a flux, all parts being by dry weight.

11. A process for brazing refractory particles onto a steel tool blank substrate so as to form a grit cutting edge thereon, which process comprises:
 (a) applying to the substrate a brazing material selected from a cobalt-based and a nickel-based alloy; a particulate refractory material selected from the carbides, nitrides, borides and silicides of nickel and tungsten and having a mass median particle size in the range 0.01 to 6 mms; a binder composition comprising an acrylic polymeric material; and optionally a flux material selected from fluoride based fluxes and borax/boric acid mixtures; said materials being used in proportions of from 5 to 10 parts of refractory material, 1 to 2 parts of brazing material, from 2 to 5 parts of binder composition and, optionally, from 1 to 2 parts of flux, all parts being by dry weight;
 (b) connecting the substrate to a source of an electric current to cause a current of from 50 to 250 amps at from 10 to 50 volts to flow through the substrate whereby the substrate is heated to sufficient temperature to cause the brazing material to fuse in a protective atmosphere at part of which is provided by volatilisation and decomposition products from the binder composition; and
 (c) optionally re-heating the brazed substrate to cause thermal tempering thereof by passing a further electric current therethrough during cooling of the substrate following brazing.

12. A method for forming a brazed layer on a substrate wherein the flexible base material is removed from a substrate to expose the adherent interface binder composition, a brazeable coating material is applied to the exposed binder composition, and the coated substrate is subjected to heating to cause the coating to be fused to the substrate.

* * * * *